United States Patent [19]

Savioli

[11] Patent Number: 4,653,364
[45] Date of Patent: Mar. 31, 1987

[54] APPARATUS AND PROCESS FOR CONTROLLING THE WORK PHASES OF A CUTTER DEVICE MOVABLE ON CONTINUOUSLY EXTRUDED TUBES

[75] Inventor: Leopoldo Savioli, Alfonsine, Italy

[73] Assignee: S.I.C.A. Serrande. Infissi Carpenteria Attrezzatura S.p.A., Alfonsine, Italy

[21] Appl. No.: 875,243

[22] Filed: Jun. 16, 1986

Related U.S. Application Data

[63] Continuation of Ser. No. 618,185, Jun. 7, 1984, abandoned.

[30] Foreign Application Priority Data

Jun. 21, 1983 [IT] Italy ................................ 3471 A/83

[51] Int. Cl.⁴ .............................................. B26D 1/60
[52] U.S. Cl. .......................................... 83/37; 83/287; 83/294; 83/369
[58] Field of Search .......... 185/287, 37, 288, 290–292, 185/295–296, 299, 318–320, 368, 369

[56] References Cited

U.S. PATENT DOCUMENTS

| | | | |
|---|---|---|---|
| 2,163,967 | 6/1939 | Strawn et al. | 83/319 |
| 3,251,255 | 5/1966 | Bauman | 83/295 |
| 3,310,855 | 3/1967 | Orioli | 83/295 |
| 3,373,642 | 3/1968 | Simpson | 83/319 |
| 3,490,322 | 1/1970 | Romes | 83/295 |
| 3,566,728 | 3/1971 | Ohmasu | 83/292 |
| 3,717,058 | 2/1973 | McMinn | 83/292 |
| 3,785,229 | 1/1974 | Halberschmidt et al. | 83/294 |

Primary Examiner—Frank T. Yost
Assistant Examiner—Hien H. Phan
Attorney, Agent, or Firm—Laff, Whitesel, Conte & Saret

[57] ABSTRACT

The present invention relates to an apparatus and to a process for controlling the work phases of a cutter device movable on continuously extruded tubes and has operating means designed to detect the relative position of the cutter device with respect to the tube, as well as to set in motion means for displacing the said cutter device between constantly variable limit positions while the process continuously detects the displacements of a tube with respect to the cutter device and causes the cutter to undergo measured displacement on the tube and periodically varies the length of the tubes to be cut.

2 Claims, 1 Drawing Figure

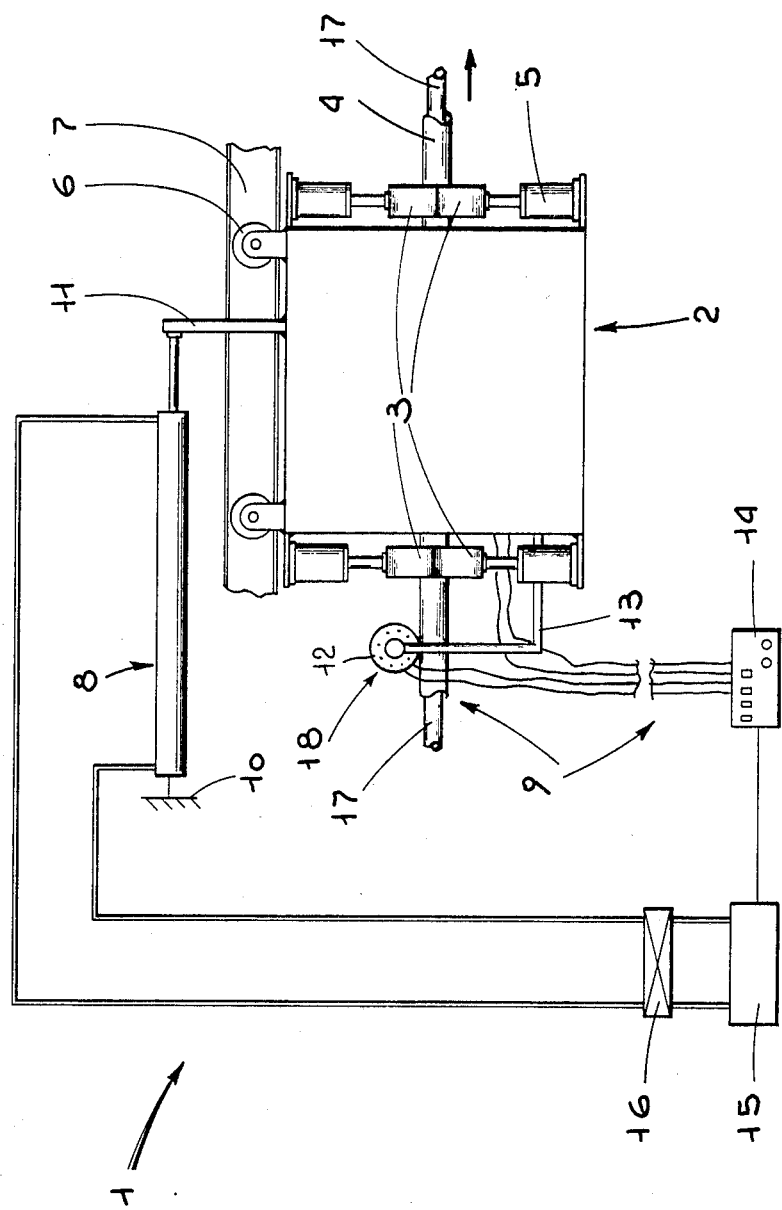

APPARATUS AND PROCESS FOR CONTROLLING THE WORK PHASES OF A CUTTER DEVICE MOVABLE ON CONTINUOUSLY EXTRUDED TUBES

BACKGROUND OF THE INVENTION

This is a continuation of U.S. patent application Ser. No. 618,185, filed June 7, 1984, now abandoned.

The invention relates to an apparatus and process for controlling the work phases of a cutter device movable on continuously extruded tubes.

DESCRIPTION OF THE PRIOR ART

As is known, plastic material tubes, destined for example for the construction of gutters and drains in general, are produced by means of continuous extrusion and are subsequently cut to size to suit the envisaged requirements.

The cutting or subdividing of the said tubes into lengths of a size proportionate to the different exigencies is customarily effected by cutter devices movable in a reciprocating fashion on the extruded tubes.

In practice, the said cutter devices, in themselves known, are provided with jaws able to lock onto the moving tubes, as well as with cutting means that sever the tubes when the said jaws are locked. The operation of the cutting means is performed with an annular movement since the tubes are internally supported by a metal rod that passes through them. Means provided for the purpose move the cutter device at the time the jaws are open.

The work phases of the said cutter device are as follows. Initially, the device is placed in a datum position while the tube to be cut moves forward. Once close to where the cutting is to take place, the jaws are locked onto the tube and the severing operation is carried out with the device in motion integrally with the tube. Upon completion of the cutting operation, the jaws open immediately and the device returns to the said initial position pending the arrival of the next tube to be cut.

All the said phases are controlled by an apparatus based on the use of a sensor able to detect the absolute displacements of the continuously extruded tube.

This modus operandi for cutting tubes has proved to be acceptable only when the speeds at which the said tubes are extruded are relatively low and there is an interval between one cutting operation and the other. With the rise in extrusion speeds, the displacement rhythm of the cutter device has been seen to be unsatisfactory or acceptable only in the case of relatively long tubes. One has to consider, in fact, that the movement speed of the said cutter device cannot possibly be increased above a given limit on account of the fact that the mass of the device is considerable.

Furthermore, the fact also has to be considered that when the speed of the tube in question is relatively high, the jaws of the cutter device, and the tube itself, undergo a violent jerk at the time the former close, since they become instantaneously integral with the tube.

It is not possible to overcome the said serious problems through the designing of a cutter device that does not become integral with the moving tube during the cutting operation. This is obviously since inaccurate cutting lines and a loss of symmetry would be all the greater at a high tube extrusion speed. On the other hand, however, the said cutter device is fully efficient insofar as the specific cutting operation is concerned and in itself does not require substantial structural modification.

SUMMARY OF THE INVENTION

The technical task at the basis of the invention is, in view of the situation, to devise an apparatus and a process for controlling the work phases of a cutter device of the said type with which to overcome the said difficulties.

One important object of the invention falling within the framework of the said technical task is to devise an apparatus and a process which, though utilizing a cutter device in itself known, also make possible the production of tubes of a limited length, even in the face of a relatively high extrusion speed.

Another object of the invention is to make available an apparatus and a process of a comparatively simple type that is easy to make and for the industries concerned to adopt.

The said technical task and foregoing objects are attained by an apparatus for controlling the work phases of a cutter device movable on continuously extruded tubes, having displacement means designed to give the said device a reciprocating movement in the direction in which the said tube extends, and means for operating the said displacement means and the said cutter device, comprising at least one sensor able to detect the position of the said cutter device; the said operating means being of a structure such as to be able to detect the relative position of the said cutter device with respect to the said tube, as well as to set the displacement means in operation between constantly variable limit positions.

Advantageously, provision is made for a process with to control the work phases of a cutter device movable on continuously extruded tubes, and this consists in: detecting, in an unbroken fashion, the displacements of a said tube with respect to a said cutter device and of causing the said cutter device to undergo measured displacements on the said moving tube that are independent of the absolute positions adopted by the said device; and periodically varying the lengths of the tubes produced by cutting so as to oblige the said cutter device to be placed cyclically in an initial datum position that is not dependent on the displacements of the said tube.

BRIEF DESCRIPTION OF THE DRAWING

Further characteristics and advantages will become more apparent from the description of one preferred but not sole embodiment for the invention, illustrated as an unlimited example on the accompanying drawing, the one and only FIGURE of which shows, diagrammatically, a cutter device, an extruded tube and an apparatus for controlling the said cutter device.

DESCRIPTION OF THE PREFERRED EMBODIMENT

With reference to the said FIGURE, shown globally at 1 is the apparatus that controls the work phases of a movable cutter device 2, of a type in itself known, defined essentially by a pair of jaws 3 that can be locked onto a tube 4 in movement since continuously extruded by a machine provided for this purpose. The jaws 3 are, for example, operated by fluid-dynamic groups 5 and they can contain cutting means, for example of the rotating or the annular type, able to shear the tube 4 without touching a support bar 17 inserted internally therein. The complete cutter device 2, in itself still of a known type, is suspended by means of wheels 6 from upper guides 7 that extend parallel to the tube 4.

The apparatus 1 according to the invention comprises displacement means 8 designed to give the cutter device 2 a reciprocating movement, and means 9 for operating the displacement means 8.

The latter are constituted by a double acting displacement cylinder that extends between a fixed element 10 and an element 11 of connection with the cutter device 2.

The operating means 9 comprise a detection device 18, which in the case described herein is a sensor 12, for discovering the relative position of the cutter device 2 with respect to the tube 4. In the specific case under consideration, there is one single sensor 12 constituted by an encoder resting circumferentially on the tube 4, sustained in the center, through a support 13, by the cutter device 2.

In a further non-illustrated embodiment for the apparatus, it is possible for there to be two separate sensors: namely, a first sensor that detects the absolute displacements of the tube 4, and a second sensor that detects also the absolute displacements of the cutter device 2.

Furthermore, the operating means 9 also comprise electronic equipment 14 for processing the signals from the sensor 12, or from the said pair of sensors, and for taking note of the absolute displacements of the tube 4 and of the cutter device 2. In the latter connection, the electronic equipment 14 subtracts one from the other, or adds one to the other, the values in respect of the said absolute displacements, depending on whether they conform or do not conform.

The electronic equipment 14 directly regulates a hydraulic group 15 which, through the interposition of control valves 16 designed to dose as required the flow of fluid to and from the displacement cylinder, controls the displacement cylinder.

The way in which the apparatus according to the invention works is obvious and requires no particular explanation: the sensor or encoder 12, traversing together with the cutter device 2 and resting directly on the tube 4, determines the relative displacements of the cutter device 2 with respect to the said tube. These relative displacements are processed by the electronic equipment 14 and are converted into appropriate impulses by the hydraulic group 15 that controls the displacement cylinder.

The process that advantageously can be put into practice with the above described apparatus is as follows. A constant watch is kept, for example by means of the said sensor 12, on the relative displacements that occur between the tube 4 and the cutter device 2.

On the basis of the said relative displacements, the cutter device 2 is controlled in such a way that lengths of tube 4 identical in size to the cut tubes it is wished to produce, are made to pass. The lengths in question are measured directly on the moving tube 4 and are completely irrespective of the absolute position of the cutter device 2.

In this way, the cutter device can, if necessary, gradually move away from the initial datum position set for it by, for example, the displacement cylinder. Provision is made, however, for the cutter device 2 not to reach the limit position thereof, or at any rate not to exceed this, thanks to a periodic variation in the length of the tubes to be produced by cutting, the said periodic variation being so selected as to place cyclically the cutter device 2 in the region of the said initial datum position.

Furthermore, advantageously it is envisaged that the displacements of the cutter device 2 be effected at absolute dampened speeds in the region of dead or inversion points in the movement of the said cutter device 2 That is, the cutter device 2, when moving either to the right and to the left, to find a predetermined cut-off position can be displaced at absolute dampened speed with respect to the working speed, respectively to the right or to the left (right or left dead points), whether it is positioned at the end- or initial-positions of the run, in this way advantageously eliminating impacts of the same cutter device 2. The said dampening action can be obtained, for example, through the valves 16 that control the flow of the fluid. In addition, the displacements of the cutter device 2 are arranged in a way whereby the absolute speed reached by this is similar to that of the tube to be cut at a time immediately prior to the operations of grasping the tube 4. In practice, the jaws 3 of the device 2 can be made to operate not in the region of the dead points in the movement of the said device but after this has resumed moving in the same direction as the tube 4. Thus impact and recoil between the cutter device 2 and the tube 4 are advantageously eliminated.

Thanks to the apparatus and process described above, it is possible to shear the tube 4 into lengths of even very reduced sizes without impact or jolt.

In cases when tubes have to be cut to a length of only 200 mm, the work phases can, by way of an example, be as described below.

At the commencement, the device 2 waits in the said initial datum position for a suitable length of tube 4 to pass and then, for example, starts traversing with the said tube, and just as soon as the device 2 attains a speed close to that of the tube 4, the jaws 3 close and the cutting operation is performed.

Once the shearing has been effected, the jaws 3 open and a return phase towards the said datum position begins. The tube 4 continues, during the said return phase, to move and the relative displacements between the tube and the cutter device, realized in practice by the sum of the absolute displacements of these, are detected. Immediately an overall relative displacement of, for example, 140 mm is detected, the cutter device 2 is made to come to a standstill irregardless of the absolute position thereof. The phases of closing the jaws 3 are then made to take place while the tube continues to move until a predetermined cut-off point is reached.

Prior to the closing of the jaws 3, it is preferable that the cutter device 2 be reset in motion in a direction parallel to that of movement of the tube 4.

Once the shearing operation is over, the jaws 3 open anew and the cutter device moves backwards once more, each time into positions constantly further away from the said initial datum position, when the tube 4 is very fast moving and the lengths to be cut are of a reduced size.

When the cutter device 2 approaches the limit set by the displacement cylinder, a cutting phase that produces a particularly long tube, such that is to say as to permit the cutter device 2 to return to the initial datum position, takes place, and in this way, the full working process can continue cyclically.

The invention as envisaged herein is liable to undergo numerous modifications and variants, all of which falling within the conceptual framework thereof.

Furthermore, all the parts may be substituted with others that are technically equivalent.

In practice, the materials used as also the shapes and sizes thereof may be any according to the requirements.

What is claimed is:

1. Method for cutting a continuously extruded tube into tube segments on the fly, comprising the steps of:
   (a) providing a flying cutter device adapted to grip and move with the extruded tube during cutting between a pair of tube grip and tube release positions associated with each cut;
   (b) reciprocating the flying cutter device between said tube grip and tube release positions for each cut;
   (c) automatically detecting the relative motion and computing the relative displacement between the extruded tube and the flying cutter device; and,
   (d) automatically advancing, in response to the computed relative tube-cutter displacement, the absolute locations of the pairs of tube grip and tube release positions in the direction of tube extrusion as needed in each succeeding cut to keep the next position on the tube where a cut is targeted from slipping past the flying cutter device before the cutter device can reach its next tube grip position.

2. Apparatus for cutting a continuously extruded tube into tube segments on the fly, comprising:
   (a) a flying cutter device adapted to grip and move with the extruded tube during cutting between a pair of tube grip and tube release positions associated with each cut;
   (b) displacement means for reciprocating the flying cutter device between said tube grip and tube release position for each cut;
   (c) relative motion determining means for sensing and determining the relative displacement between the tube and the flying cutter device; and
   (d) control means, responsive to the relative motion determining means, for automatically advancing the absolute locations of the tube grip and tube release positions in the direction of tube extrusion as needed in each succeeding cut to keep the next position on the tube where a cut is targeted from slipping past the flying cutter device before the cutter device can reach its next tube grip position.

* * * * *